United States Patent [19]

Matsushima et al.

[11] Patent Number: 4,809,939

[45] Date of Patent: Mar. 7, 1989

[54] LONGITUDINAL SEAT SLIDING APPARATUS FOR AUTOMOBILES

[75] Inventors: Toshiro Matsushima; Hiroshi Ueda, both of Saitama, Japan

[73] Assignee: Honda Giken Kogyo Kabushiki Kaisha, Tokyo, Japan

[21] Appl. No.: 114,687

[22] Filed: Oct. 29, 1987

[30] Foreign Application Priority Data

Oct. 31, 1986 [JP] Japan .................. 61-260446

[51] Int. Cl.$^4$ .................................. F16M 13/00
[52] U.S. Cl. ........................ 248/430; 248/393
[58] Field of Search ............. 248/429, 430, 393; 296/65 R; 384/18, 19, 34, 56, 47; 297/318, 317, 344, 387; 312/339

[56] References Cited

U.S. PATENT DOCUMENTS

| | | | |
|---|---|---|---|
| 2,278,101 | 3/1942 | Browne | 248/430 |
| 3,210,135 | 10/1965 | Goller | 384/56 X |
| 3,469,893 | 9/1969 | Hudson | 384/56 X |
| 3,926,397 | 12/1975 | Huninicks | 248/430 |
| 4,209,159 | 6/1980 | Becker et al. | |
| 4,526,424 | 7/1985 | Korth | 248/430 X |

FOREIGN PATENT DOCUMENTS

| | | | |
|---|---|---|---|
| 737270 | 6/1966 | Canada | 248/430 |
| 2545763 | 4/1977 | Fed. Rep. of Germany | 248/430 |

Primary Examiner—J. Franklin Foss
Attorney, Agent, or Firm—Lyon & Lyon

[57] ABSTRACT

An apparatus for supporting an automobile seat for longitudinal sliding including a stationary rail for mounting on the automobile, a movable rail for mounting on the seat, and roller members positioned between the rails to support the movable rail on the stationary rail. The roller members have two different diameters which respectively engage the movable rail and stationary rail for causing unequal relative movement between the roller members and each of the rails whereby the rails are of different lengths.

12 Claims, 4 Drawing Sheets

LONGITUDINAL SEAT SLIDING APPARATUS FOR AUTOMOBILES

The present invention relates to a longitudinal sliding device for automotive seats in which the seat is secured to movable rails that are supported by roller members that are in turn movably supported on stationary rails.

In conventional apparatus of similar construction, the stationary rail and movable rail are in rolling contact with roller members at points that are the same distances from the rotating axis of the roller member.

It is known that the distance the seat or movable rail travels with respect to the stationary rail is the sum of the distance the roller member moves along the stationary rail and the distance the movable rail travels relative to the roller member. In a conventional apparatus in which the movable rail and stationary rail are in sliding contact with the roller member at points that are the same distances from the rotating axis of the roller member, the distance the roller member travels on the stationary rail is equal to the distance the movable rail travels relative to the roller member and thus the distance traveled by the roller member is one-half of the total distance traveled by the movable rail with respect to the stationary rail. Therefore, when either the distance traveled by the roller member or the relative distance traveled by the movable rail is limited, the other distance is also limited accordingly. This means that shortening the length of one of the rails results in a reduction in the stroke through which the seat is permitted to move.

This invention has been accomplished in the light of the above circumstance and is intended to provide a longitudinal seat sliding apparatus for automobiles that permits shortening of either the stationary rail or movable rail while maintaining the travel distance of the seat.

According to this invention, the distances from the rotating axis of the roller member to the points at which the roller member is in rolling contact with the movable rail and with the stationary rail are different from each other. Since the distance the roller member travels on the stationary rail is not equal to the distance the movable rail travels relative to the roller member, the distance of travel of the seat can be maintained even if one of the rails is shortened.

The foregoing and other objects and advantages of this invention will appear from the following description of preferred embodiments the accompanying drawings, wherein.

Figure 1:
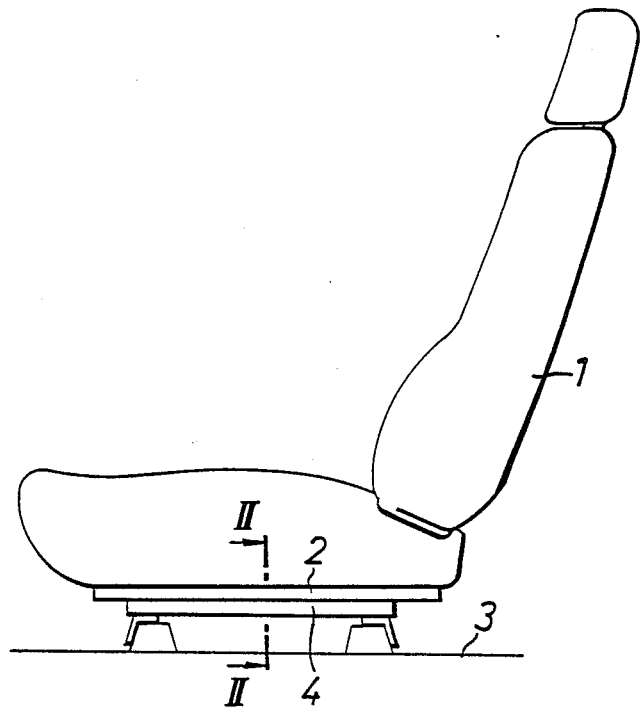
FIG. 1 is a side elevation view of an automobile seat supported for longitudinal sliding movement for adjusting the position of the seat.

Referring now to FIG. 1, the front seat 1 for a passenger automobile is securely mounted on a movable rail 2 extending longitudinally in the direction of the length of the automobile. The automobile chassis 3 has a stationary rail 4 secured thereto in a conventional manner that also extends longitudinally of the automobile. The movable rail 2 and seat 1 can move longitudinally by sliding on the stationary rail 4. Normally, there are two parallel rail assemblies supporting the seat on either side for stability which assemblies would each have a movable rail 2 and stationary rail 4.

Figure 2:
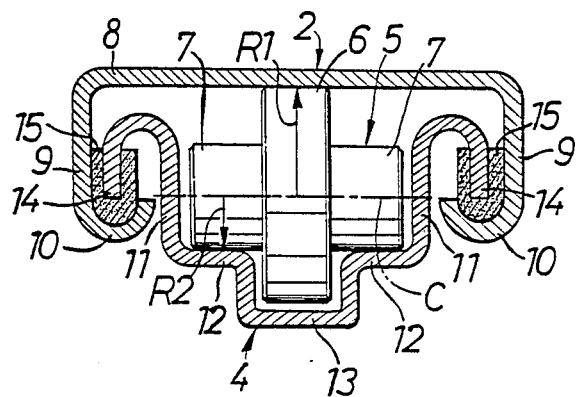
FIG. 2 is a sectional elevation view taken substantially on the line II—II in FIG. 1 and showing one of a pair rail assemblies that support the seat.

As shown in FIG. 2, roller members 5 are supported on the stationary rail 4 at two or more positions longitudinally spaced apart in such a way that they can rotate and roll along the longitudinal direction of the stationary rail 4. The movable rail 2 is supported on top of these roller members 5.

Each roller member 5 has small-diameter cylindrical portions 7 coaxially projecting on each side of a large-diameter cylindrical portion 6 whereby these cylindrical portions 6 and 7 have the same axis C. The movable rail 2 is in rolling contact with the large-diameter portion 6 and the stationary rail is in rolling contact with the small-diameter portion 7. R1 denotes the radius of the large-diameter portion 6 and R2 denotes the radius of the small-diameter portion 7, whereby the distance from the axis C of he roller member 5 to the rolling contact point between the movable rail 2 and the roller member 5, i.e., R1, is larger than the distance from the axis C to the rolling contact point between the stationary rail 4 and the roller member 5, i.e., radius R2.

The basic cross-sectional shape of the movable rail 2 includes a flat portion 8 in rolling contact with the outer periphery of the large-diameter portion 6 and, at each side, a downwardly extending side plate portion 9 as an integral part. The side plate portions 9 are bent inward and upward at their lower ends to form inwardly curved engagement portions 10. The basic cross-sectional shape of the stationary rail 4 includes side plate portions 11 facing the outer ends of the small-diameter portions 7 of the roller member 5; step portions 12 provided at the lower ends of the side plate portions 11 for supporting the small-diameter portions 7 of the roller member 5; and a U-shaped groove 13 connecting the inner ends of the step portions 12 to accommodate a part of the large-diameter portion 6 of the roller member 5. The side plate portions 11 have engagement portions 14 integrally projecting from the upper ends and curing downwards toward the engagement portions 10. Fitted to the lower ends of the engagement portions 14 are sliders 15 that are in sliding contact with the engagement portions 10 to prevent any possible deviations of the movable rail 2 relative to the stationary rail 4 in the direction of axis C and also to prevent a lateral inclination or tipping of the movable rail 2.

Figure 3:
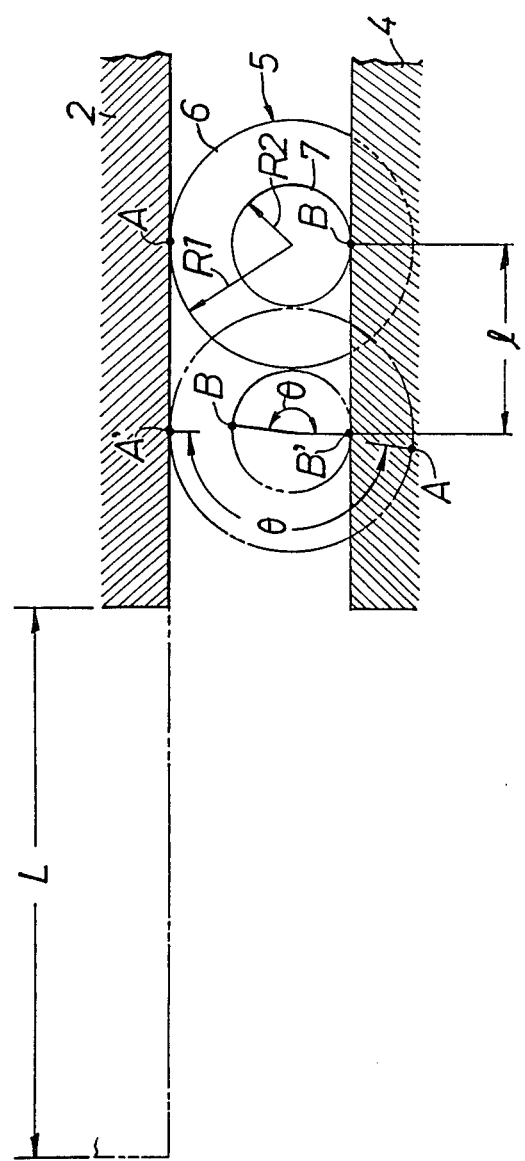
FIG. 3 is a diagrammatic side view illustrating the operating principle of the present invention.

Now, the operation of this embodiment will be explained by referring to FIG. 3. Consider the case where the seat 1 and movable rail 2 is slid forward the distance L and the resultant angular displacement of the roller member 5 is $\theta$ radian. In this case, the distance l the roller member 5 moves on the stationary rail 4 is equal to the length of arc between points B and B' on the circumference of the small-diameter portion 7 and is given by $$l = R2.\theta \tag{1}$$

The distance l' the movable rail 2 travels with respect to the roller member 5 is equal to the length of arc between points A and A' on the circumference of the large-diameter portion 6 and is given by $$l' = R1.\theta \tag{2}$$

Since $L = l + l'$, $$L = R1 \cdot \theta + R2 \cdot \theta \qquad (3)$$
$$= (R1 + R2) \cdot \theta$$

Thus, $$\frac{l}{L} = \frac{R2 + \cdot \theta}{(R1 + R2) \cdot \theta} \qquad (4)$$
$$= \frac{R2}{R1 + R2}$$

This expression (4) means that the ratio of the distance l traveled by the roller member 5 with respect to the distance L covered by the movable rail 2 is given by the ratio of the radius R2 of the small-diameter portion 7 to the sum of the radius R1 of the large-diameter portion 6 and the radius R2 of the small-diameter portion 7.

It is thus possible to reduce the distance l traveled by the roller member 5 while maintaining the amount of travel L of the movable rail 2 and therefore reduce the length of the stationary rail 4 by the corresponding amount.

Figure 4:
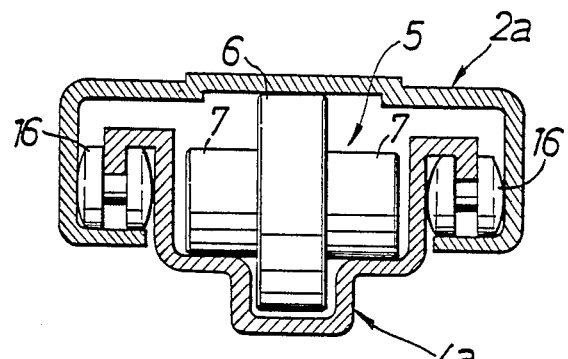
FIGS. 4 through 7 are sectional elevation views similar to FIG. 2 that additional embodiments of the invention.
Figure 5:
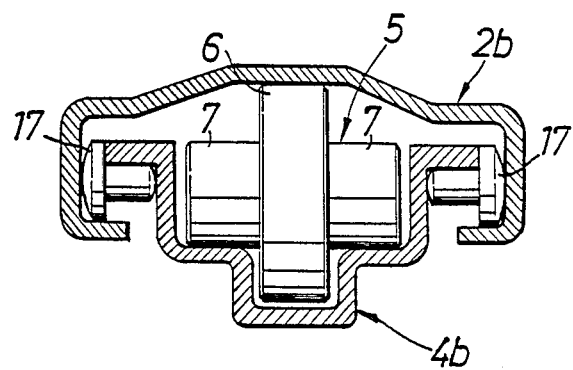

FIGS. 4 and 5 show second and third embodiments of this invention which differ from the first embodiment by providing between the stationary rails 4a, 4b and the movable rails 2a, 2b a pair of auxiliary rollers 16, 17 instead of the slider 15.

Figure 6:
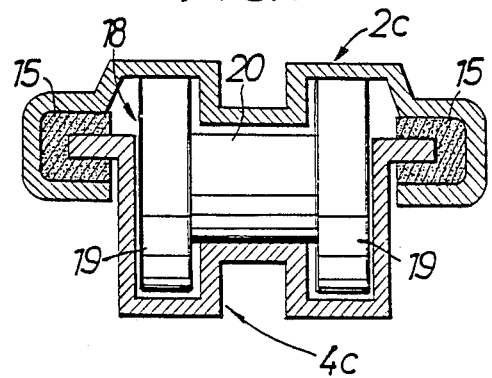

FIG. 6 shows a fourth embodiment of this invention wherein the roller member 18 comprises a pair of large-diameter cylindrical portions 19 interconnected by a coaxial small-diameter cylindrical portion 20. The movable rail 2c is supported on the pair of large-diameter portions 19 with the small-diameter portion 20 rotatably supported on the stationary rail 4c.

Figure 7:
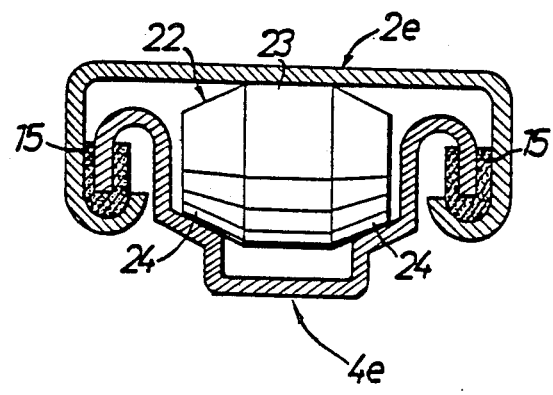

FIG. 7 shows a fifth embodiment of this invention. The roller member 22 comprises a cylindrical portion 23 which has coaxial truncated cones 24 on each axial end thereof, the truncated cones tapering to a reduced diameter toward their outer end. The movable rail 2e is in rolling contact with the cylindrical portion 23 of the roller member 22, and the stationary rail 4e is in rolling contact with at least a portion of the truncated cones 24.

In each of the foregoing embodiments, the stationary rail is in rolling contact with a cylindrical portion having a shorter radial distance from the axis of the roller member than the radial distance to the cylindrical portion which provides the rolling contact between the roller member and the movable rail, in order to reduce the length of the stationary rail. Conversely it is also possible to make the movable rail contact a portion of the roller member that is at a shorter radial distance from the axis of the roller member than the roller member portion contacting the stationary rail which results in a reduction in the length of the movable rail.

With this invention, since the distances from the axis of the roller member to the rolling contact points with the movable rail and with the stationary rail are different from each other, it is possible to make either the distance traveled by the roller member or the distance traveled by the movable rail with respect to the roller member smaller, and, therefore, to reduce the length of either the movable rail or the stationary rail while maintaining the amount of travel of the seat.

We claim:

1. A longitudinal seat sliding apparatus comprising a stationary rail, roller members supported on and rotatably movable along the stationary rail, and a movable rail supported on the roller members and to which the seat is rigidly secured, each roller member having a first cylindrical portion of a first diameter contacting at least one of the rails and a second cylindrical portion of a second diameter different from the first diameter contacting the other of said rails, the first and second cylindrical portions each having cylindrical slide contact surfaces extending parallel to the rotational axis of the roller member.

2. The apparatus of claim 1 wherein said first diameter is larger than said second diameter.

3. The apparatus of claim 1 wherein said second diameter is larger than said first diameter.

4. The apparatus of claims 2 or 3 wherein said two cylindrical portions contact the stationary rail.

5. The apparatus of claims 2 or 3 wherein said two cylindrical portions contact said movable rail.

6. The apparatus of claim 1 wherein means are provided in interengagement between said movable rail and stationary rail for guiding the relative sliding movement between said rails for preventing lateral or tipping relative movement.

7. The apparatus of claim 6 wherein said means includes a pair of laterally spaced sliders each engaging both of said rails.

8. The apparatus of claim 6 wherein said means includes a pair of laterally spaced auxiliary rollers in rolling engagement with said rails.

9. The apparatus of claim 1 further comprising a pair of laterally spaced apart auxiliary rollers in rolling engagement with said movable rail and said stationary rail for guiding relative movement between said rails, each auxiliary roller including two spaced apart first auxiliary roller surfaces joined to a second auxiliary roller surface of lesser diameter than the first auxiliary rollers.

10. The apparatus of claim 9 wherein each auxiliary roller has a generally H-shaped cross-section.

11. The apparatus of claim 1 further comprising a pair of laterally spaced apart auxiliary rollers in rolling engagement with said movable rail and said stationary rail for guiding relative sliding movement between said rails, each auxiliary roller including an auxiliary cylinder joined to an auxiliary roller surface.

12. The apparatus of claim 11 wherein the auxiliary roller has a generally T-shaped cross section.

* * * * *